Oct. 17, 1933.   R. E. SMITH   1,930,828
SAFETY DEVICE FOR MOTOR VEHICLES
Filed Oct. 17, 1932   2 Sheets-Sheet 1
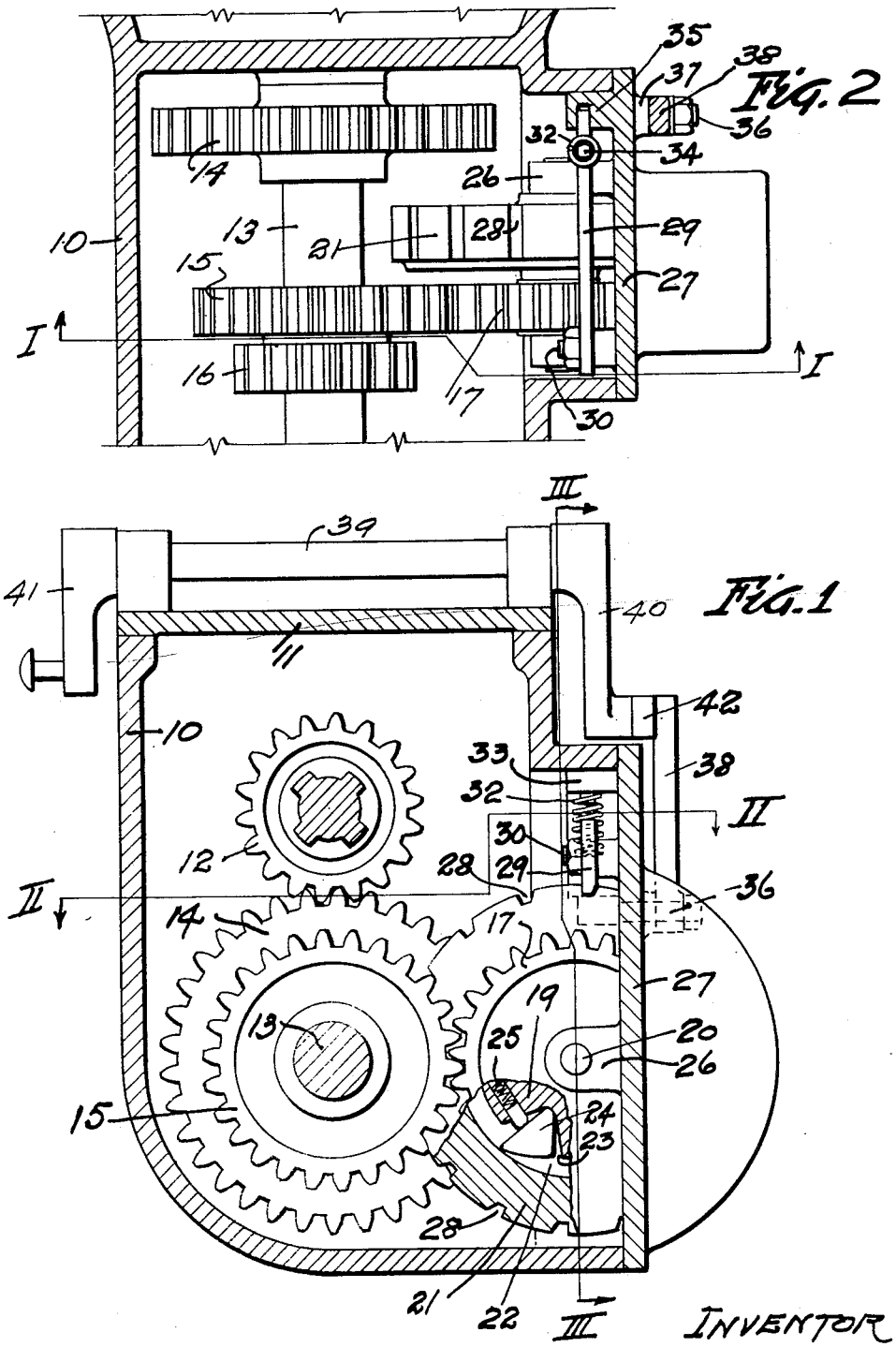
INVENTOR
Robert E. Smith Oct. 17, 1933.   R. E. SMITH   1,930,828
SAFETY DEVICE FOR MOTOR VEHICLES
Filed Oct. 17, 1932   2 Sheets-Sheet 2
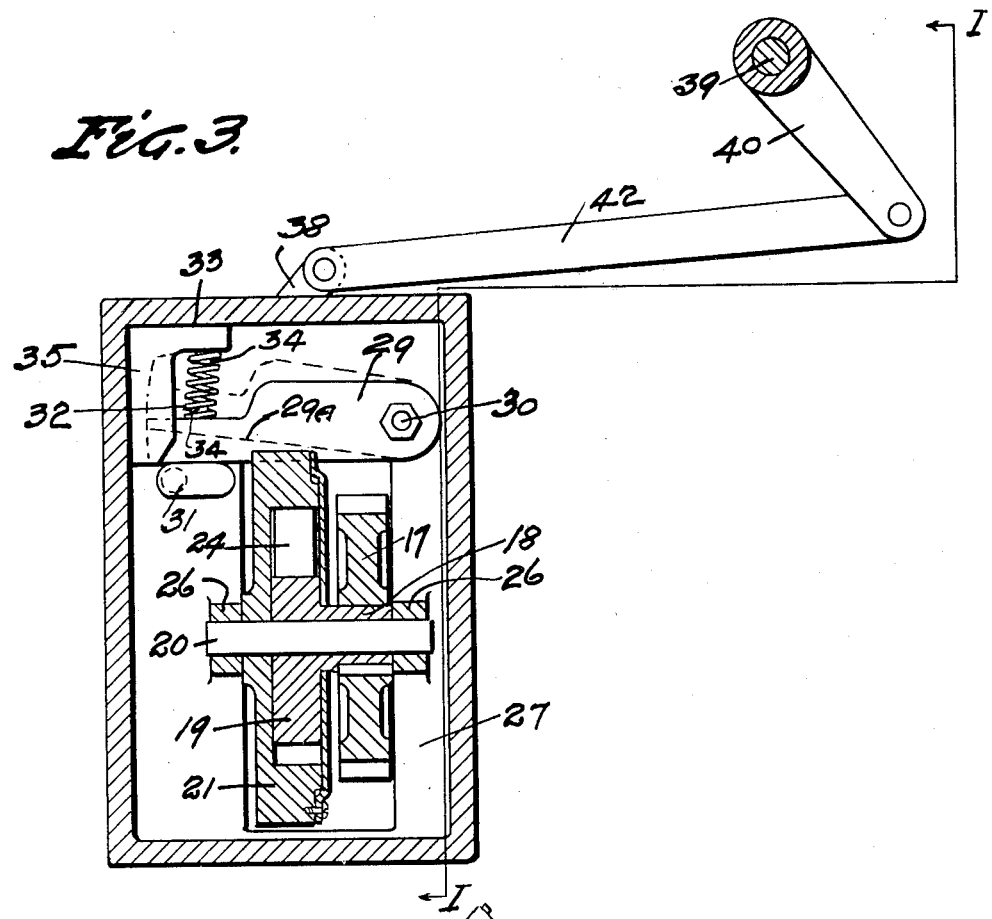
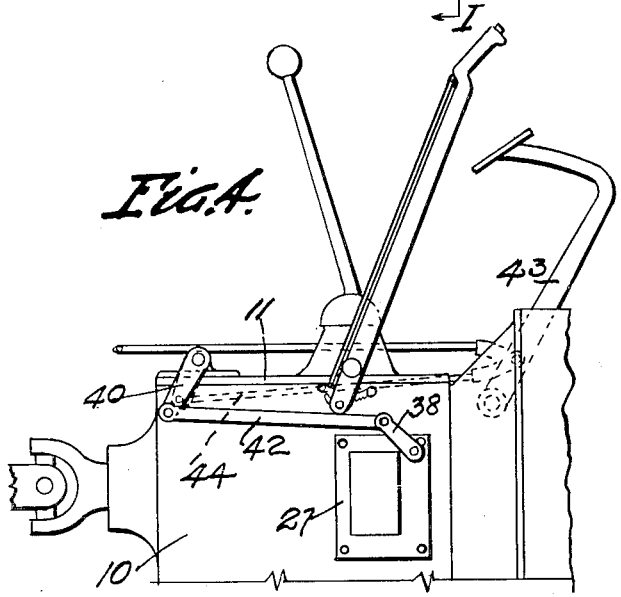

Patented Oct. 17, 1933

1,930,828

UNITED STATES PATENT OFFICE 1,930,828

SAFETY DEVICE FOR MOTOR VEHICLES

Robert E. Smith, Memphis, Tenn.

Application October 17, 1932. Serial No. 638,156

4 Claims. (Cl. 192—4)

This invention relates to safety devices for motor vehicles, which devices prevent the vehicle from rolling backward when in forward gear or forward when in reverse gear and to means for releasing the devices or rendering them inoperative.

Transmissions as used on motor vehicles include certain shafts and gears which are rotated in one direction only under all normal conditions of operation of the vehicle. These include the main driving gear and its shaft, the countershaft and its gear and the reverse idler. The only time that any member of this train reverses its direction of rotation is when the car is moving backward while in forward gear, or forward while in reverse gear. Neither of these movements is at any time necessary or advantageous and either one may readily be the cause of serious accident especially on steep grades.

It has previously been attempted to prevent the backward rotation of these gears, but it has been found that when the safety device has acted and is under strain, it is often impossible to release the device for the accomplishment of gear shifting, which latter is almost invariably necessary after the safety device has acted and accomplished its function.

The objects of my invention are to promote the safety of automobiles or other types of motor vehicles by confining the movement of the vehicle to the direction determined by the setting of the gear lever;

To provide means for accomplishing the release of the safety device; and

To provide means for adapting a device of this kind to usual types of transmission gearing such as are used on motor vehicles.

The means by which the foregoing and other objects are accomplished and the manner of their accomplishment will readily be understood from the following specification on reference to the accompanying drawings, in which:

Fig. 1 is a transverse section through a typical automobile transmission case, taken as on the line I—I of Fig. 2.

Fig. 2 is a fragmentary sectional plan taken as on the line II—II of Fig. 1.

Fig. 3 is a vertical section taken as on the line III—III of Fig. 1; and

Fig. 4 is a fragmentary side elevation on a reduced scale of the transmission case showing its relation to the brake pedal of the automobile.

Referring now to the drawings in which the various parts are indicated by numerals, 10 is the transmission case and 11 a removable top therefor. 12 is the main driving gear, 13 is the countershaft and 14 the countershaft drive gear mounted on and secured to the shaft and meshing with the gear 12. 15, 16 are respectively the second and low speed countershaft gears, which are keyed or otherwise secured in usual manner to the countershaft. The gear 16 also drives the reverse gearing in usual manner.

My safety device, comprises an auxiliary gear 17 which meshes with one of the countershaft gears, as for instance the gear 15, and which auxiliary gear is mounted on and keyed to the hub 18 of an over-running clutch. This clutch may be of any usual or desired type, but as illustrated comprises a disc 19 secured to or integral with the hub 18 and jointly therewith journalled on a shaft 20. Embracing the disc 19 and similarly journalled on the shaft 20 is a complementary clutch part 21, which has a chamber 22 formed therein, concentric with and adapted to receive and be radially spaced from the periphery of the disc 19. The disc 19 is provided with a plurality of substantially V shaped notches 23 extending inwardly from the periphery thereof. Disposed in each of these notches is a substantially triangular dog 24 which bottoms in the V shaped groove and is held in engagement with the cylindrical wall of the chamber 22 by a spring 25. The whole is typical of a well known form of over-running clutch which permits relative movement of the parts 21 and 19 in one direction and prevents such relative movement in the opposite direction. Since one of these parts is normally held against rotation and the other normally turns, they are also hereinafter referred to in the claims as the stator and the rotor.

Preferably the shaft 20 is carried by bosses 26 which are integral with a removable cover plate 27 which closes a complementary opening in the transmission case and provides means for removing the safety device as a unit.

The periphery of the clutch part 21 is provided with a plurality of notches 28, any one of which may be engaged by a latch 29. One end of the latch 29 is pivotally mounted on a pin 30 and the opposite end of the latch rests on an oscillatable cam 31. This cam, when turned, raises the latch to the dotted position 29A and disengages it from the notches 28. The free end of the latch 29 is urged downward by a spring 32, the opposite end of which bears against an abutment 33 integral with the cover plate 27. Pins 34 center the spring 30 in place on the latch and abutment. The free end of the latch 29 preferably is guided in its movement by a slotted or grooved member 34 also integral with the cover plate.

The cam 31 is carried by a shaft 36 which projects through, and is journalled in, the cover 27 and a boss 37 thereon. Exterior to the cover plate is an arm 38 which is secured to the shaft 36 to turn the cam. 39 is a rocker shaft suitably mounted on the top 11, which shaft has secured thereto rocker arms 40, 41. The arm 40 is connected by a link 42 with the arm 38, and the arm 41 to the brake pedal lever 43 of the vehicle by a link 44.

A vehicle equipped with this safety device is used in ordinary manner without reference thereto or action thereby. During such use the latch 29 is held in engagement with some one of the notches 28 of the over-running clutch by the spring 32, thus holding the outer part of the clutch stationary. The disc 19 of the clutch however is free to turn in one direction and thus permits normal rotation of the countershaft which is geared thereto through the countershaft gear 15 and the auxiliary gear 17. In stopping the car, pressure on the brake pedal disengages the latch from the notches and during such action temporarily renders the device inoperative, but release of the brake concurrently releases the latch and permits the same to again engage with a notch and again bring the device into operation. Should the car be in forward gear any tendency thereafter of the car to roll backward thereby reversing the direction of motion of the countershaft would cause the over-running clutch to immediately act and positively stop such reverse movement, the same also would be true if the car were in reverse gear except that it would then be locked against forward movement.

The gears of the transmission are by either action placed under such strain that shifting of the gears is practically impossible when attempt is again made to start the car forward or backward after such locking action. In such event, pressure may be exerted on the brake pedal to disengage the latch and release the gear lock. If for instance the car should stall going up a hill, the locking action of the device would be automatic and absolutely prevent any tendency of the car to roll backward. Such stalling action ordinarily results in killing the engine, usually with the car in high or second gear.

With the car locked against reverse movement the clutch may be disengaged and the engine again started and brought up to speed. Should it be necessary to change gears, the brake may be applied, releasing the reverse lock and permitting the gears to be shifted into low gear, after which the brake may be again released and the car held by the reverse lock. While so held, the clutch may be let in and the car again started forward in usual manner.

It will be further understood that the details of construction herein shown are typical and are introduced for purposes of illustration only, and that I do not intend to be limited in any claim to such details except as they may be specifically set out in such claim.

Having described my invention, what I claim is:

1. In a device of the character described, for a motor vehicle having braking mechanism, and transmission gearing including a countershaft; an over-running clutch, means operatively connecting the rotor of said clutch to said countershaft, a latch engageable with the stator of said clutch to prevent rotation thereof, resilient means urging said latch into engagement with said stator, and means controlled by said braking mechanism for temporarily disengaging said latch.

2. In a safety device for a motor vehicle having braking mechanism and transmission gearing including a countershaft; an over-running clutch, means operatively connecting the rotor of said clutch to said countershaft, a latch engageable with the stator of said clutch, a spring urging said latch into engagement, a cam engaging said latch and means connecting said cam and braking mechanism, whereby actuation of said braking mechanism will disengage said latch.

3. In a safety device for a motor vehicle having braking mechanism and transmission gearing including a countershaft; an over-running clutch, gears operatively connecting the rotor of said clutch to said countershaft, a latch engageable with the stator of said clutch to prevent rotation thereof, and means controlled by actuation of said braking mechanism for disengaging said latch.

4. In a safety device for a motor vehicle having a brake lever and transmission gearing including a countershaft; an over-running clutch, gears operatively connecting the rotor of said clutch to said countershaft, means for locking the stator of said clutch against rotation, a cam engaging said locking means, and means operatively connecting said cam and brake lever, whereby actuation of said brake lever will disengage said stator locking means.

ROBERT E. SMITH.